UNITED STATES PATENT OFFICE.

LEOPOLD KAHL, OF NIEDERAU, NEAR DRESDEN, GERMANY, ASSIGNOR TO RUTGERS-WERKE-ACTIENGESELLSCHAFT, OF BERLIN, GERMANY.

ORTHO-OXALIC-ACID ESTER OF META-CRESOL AND PROCESS FOR THE MANUFACTURE OF THE SAME.

1,028,074. Specification of Letters Patent. Patented May 28, 1912.

No Drawing. Application filed June 21, 1909. Serial No. 503,303.

*To all whom it may concern:*

Be it known that I, LEOPOLD KAHL, chemist, a subject of the Russian Emperor, residing at Niederau, near Dresden, Germany, have invented a certain new and useful Ortho-Oxalic-Acid Ester of Meta-Cresol and Process for the Manufacture of the Same, of which the following is a specification.

The methods hitherto known for the production of phenol and cresol esters of oxalic acid consist in fusing phenol or cresol with oxalic acid at comparatively high temperatures in the presence of dehydrating agents, (C. A. Bischoff and A. v. Hedenström, *Berichte der Deut. Chem. Ges.* 35, 3443), esters of oxalic acid being formed which are distinguished by their great stability. A further method for the preparation of a cresol oxalic acid ester is described in the specifications of German Patents 137584 and 141121. According to this method only an ester of p-cresol could be obtained, which although otherwise relatively stable is distinguished by the extraordinary ease with which it can be saponified. According to the last named specification the meta-cresol forms no combination with oxalic acid under the conditions of working given therein.

Now the method which forms the basis of the present invention has for its object to produce a combination with oxalic acid of the m-cresol also, which of all the cresols possesses the most powerful disinfecting properties.

If m-cresol be allowed to stand with anhydrous oxalic acid at a sufficiently low temperature, viz. at about 15–25° C., slow combination of the cresol with the oxalic acid takes place, which finally leads to the complete solidification of the whole mass. The reaction product freed from any excess of cresol that may be present by squeezing it out consists of a body in which oxalic acid and m-cresol are present in a combining ratio of 1 to 2 and which at 51° C. melts and is at the same time immediately decomposed into its components. The body is fairly easily soluble in water, and dissolves also in the usual organic solvents, such as alcohol, ether, benzene, mostly with simultaneous decomposition.

The comparatively easy decomposition of the body in conjunction with its composition is most easily explained by assuming the existence of an m-cresol-ortho-oxalic acid of the following formula:

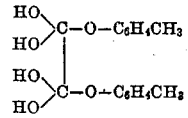

The formation of the compound takes place according to the equation:

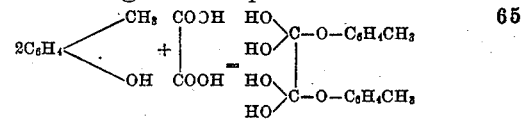

The new compound may be produced, for instance, by grinding together 216 parts of m-cresol with 90 parts of anhydrous oxalic acid at a temperature of 15–20° C. and allowing it to stand at this temperature, until the product of the reaction has become a dry powder. This is the desired ester.

The present method enables the liquid m-cresol, which of itself acts as a powerful disinfectant, to be converted into a solid compound which can be easily produced in tablet form and which, compared with pure m-cresol, also possesses considerably increased disinfecting properties.

It is already known that the cresols possess in a high degree bactericidal properties, which place them in this respect at the head of bodies of the aromatic series hitherto investigated. It is also known that of the three isomers it is the m-cresol which possesses the most powerful bactericidal properties with a relatively small poisonousness. The insolubility of the cresols in general and of the m-cresol in particular in water stood in the way of their use medicinally. Ohlmüller, Laplace, Fränkel and Jäger found, it is true, that solutions of cresols in dilute hydrochloric and sulfuric acids can be prepared which possess great efficacy against cocci and spores; any medicinal application of these strongly acid solutions could however scarcely be entertained.

An exceedingly efficient disinfecting agent for medicinal use can be obtained according to the present invention, seeing that it has been possible to bring the m-cresol, which is so efficient into a solid form. The m-cresol-o-oxalic acid ester is possessed of specially high bactericidal properties, which almost approach those of corrosive sublimate.

The forms in which the new disinfecting agent can be produced are very manifold. According to the purpose for which it is to be used it can be brought into the form of powder, tablets or solutions. For this purpose it is only necessary to pulverize the pressed out ester, make it up in the form of tablets or dissolve it. In a ½ to ¼ per cent. solution meta-cresol-ortho-oxalic acid ester almost instantly kills staphylo-cocci, which are capable of great resistance. It is therefore very suitable for medicinal purposes, the disinfection of hands, etc., as it can be used in combinations in which cauterizing actions are precluded.

For the preparation of the m-cresol-o-oxalic acid ester according to the present method the use of pure m-cresol as the initial material is by no means a necessity; on the contrary even commercial m-cresols or commercial cresols containing a more or less large quantity of m-cresol can be worked up into the ester. It is only necessary to take care, that phenol and p-cresol be removed first, say by treating the commercial cresol mixture with anhydrous oxalic acid or with oxalates, after which the residual cresols are treated according to the present method.

What I claim is:—

1. The process for the manufacture of a meta-cresol-ortho-oxalic ester, which consists in mixing meta-cresol with anhydrous oxalic acid and allowing the mixture to stand at 15-20° C., until the semi-liquid mass has become solid, substantially as described.

2. As a new product, meta-cresol-ortho-oxalic acid ester, containing two molecules of meta-cresol and one molecule of oxalic acid in chemical combination, melting at 51° C., while immediately decomposing into meta-cresol and oxalic acid, soluble in water and in the usual solvents, such as alcohol, ether and benzene, mostly with simultaneous decomposition, and being suitable as a disinfectant.

In testimony whereof I have hereunto set my hand in presence of two subscribing witnesses.

LEOPOLD KAHL.

Witnesses:
 ISIDOR RULL,
 CARL HEIL.